United States Patent [19]

Lund

[11] Patent Number: 4,998,944
[45] Date of Patent: Mar. 12, 1991

[54] REMOVABLE, ADJUSTABLE GUN SUPPORT

[76] Inventor: Richard B. Lund, 28416 Pacheco, Mission Viejo, Calif. 92692

[21] Appl. No.: 434,726

[22] Filed: Nov. 13, 1989

[51] Int. Cl.$^5$ ............................................. F41A 23/18
[52] U.S. Cl. ..................................... 42/94; 248/316.5; 248/316.8; 211/64
[58] Field of Search .............................. 42/94; 211/64; 248/222.3, 316.5, 201, 316.8, 354.5

[56] References Cited

U.S. PATENT DOCUMENTS

| | | | |
|---|---|---|---|
| 879,052 | 2/1908 | Jeranek | 42/94 |
| D. 903,680 | 2/1966 | Allison | 42/94 |
| 2,063,924 | 12/1936 | Hanko | 248/316.5 |
| 2,316,995 | 4/1943 | Smith | 248/316.5 |
| 2,586,636 | 2/1952 | Fischer et al. | 248/316.2 |
| 2,981,509 | 4/1961 | Messenger et al. | 248/316.5 |
| 3,041,938 | 7/1962 | Seabrook | 42/94 |
| 3,361,265 | 1/1968 | Wernimont | 211/64 |
| 3,473,673 | 10/1969 | Porter | 248/201 |
| 3,477,587 | 11/1968 | Hart | 248/201 |
| 4,007,554 | 2/1977 | Helmstadter | 42/94 |
| 4,449,314 | 5/1984 | Sorensen | 211/64 |
| 4,527,760 | 7/1985 | Salacuse | 248/222.3 |
| 4,776,471 | 10/1988 | Elkins | 211/64 |

*Primary Examiner*—Charles T. Jordan
*Assistant Examiner*—Michael Carone

[57] ABSTRACT

A gun support mechanism is provided which includes buttstock supporting means mounted on a support surface and forestock supporting means mounted on said support surface. The buttstock and forestock supporting means include adjustment means whereby the gun may be positioned at a selected distance from the support surface. The supporting means further include base members which may be affixed to the support surface and support members which are operatively engageable with the base members through the use of lugs or similar expedients. At least one of the supporting means include gripping means for releasably gripping the buttstock or the forestock, respectively, of the gun. The invention is readily adaptable to support objects other than guns.

3 Claims, 4 Drawing Sheets

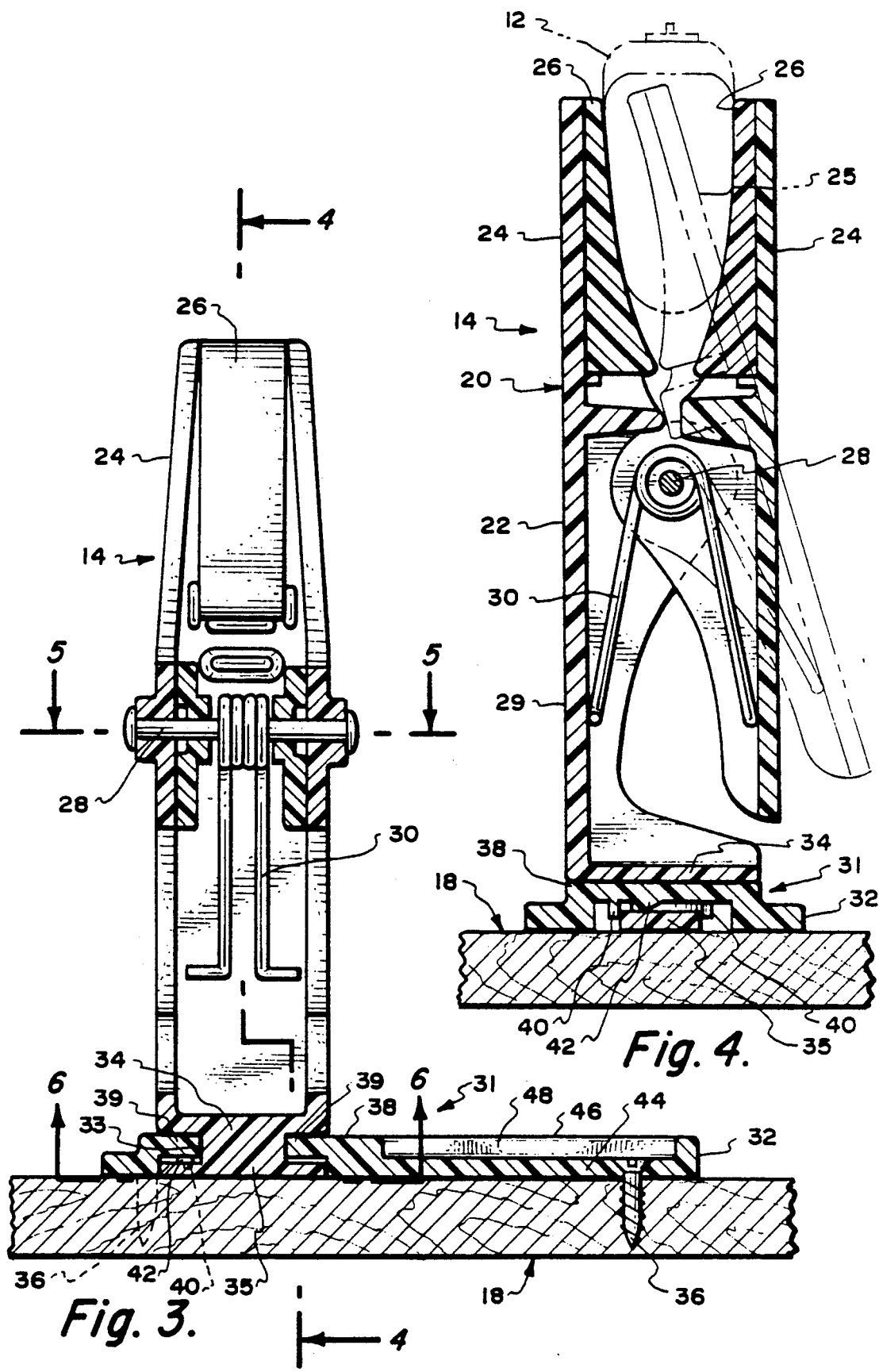

REMOVABLE, ADJUSTABLE GUN SUPPORT

Background of the Invention

This invention relates to gun supports of the character which are utilized in various aspects of gun care, such as cleaning, repairing, inspecting, maintaining, mounting and adjusting scopes, polishing, identification engraving, etc.

These operations are typically performed while the gun is relatively movable, such as while it is held in one hand or between the knees of the person performing the operation. Such typical methods of performing these operations are not only stressful, strenuous, and awkward, but are at least potentially dangerous as well. If the gun is loaded, the typical handling methods may contribute to accidentally firing the gun during cleaning, causing injury or death to the person doing the cleaning or to a bystander, or otherwise causing damage to the surroundings. In addition, the awkwardness of these prior art typical methods makes it more likely that a gun will be dropped or otherwise damaged.

The gun support of my invention alleviates these safety and convenience concerns by providing an inexpensive, lightweight, readily movable and adjustable gun support to retain the gun in a relatively fixed, and therefore relatively safe, position for the aforesaid operations. The operator's hands are freed from holding the gun and can instead be utilized for the desired cleaning or repairing function, thus reducing the distraction, stress, and associated danger caused by the aforesaid typical methods of cleaning and repairing guns.

A number of factors mandate that, in order to satisfactorily serve a broad market, a gun support must be adjustable and capable of use in various environments. The size and shape of guns varies considerably, as does the environment available to, and selected by, a gun owner for working on his gun. The dexterity of the gun owner and his particular preferences for the manner of cleaning his gun also vary, indicating that a certain degree of adjustability be included in any gun support mechanism.

Illustrative of the utilization of the device of my invention is its association with a workbench or other table having a relatively flat working surface. Conventional workbenches frequently include various devices and machines mounted on or near the working surface. Provision of a gun support of the aforementioned character which is suitable for mounting on such a workbench may conveniently and safely juxtapose the gun to equipment and supplies appropriate for use in cleaning, repairing, and/or inspecting the gun.

A permanently mounted gun support would, however, interfere with other uses of such a workbench or tabletop when the gun support is not in use. For that reason, the incorporation of ready removability from the workbench permits the gun support of my invention to be temporarily assembled and utilized, while leaving the workbench relatively clear for other uses at all other times.

In addition, the gun support of my invention is easily adaptable for utilization in a variety of locations and with a variety of objects, each of which use may provide similar safety and/or convenience benefits as those discussed above in relation to guns and workbenches.

Objects and Advantages of the Invention

It is, therefore, an object of my invention to provide a gun support characterized by the incorporation of a buttstock support member and a forestock support member, which members are suitable for mounting on a work surface and retaining the gun in a relatively fixed position for cleaning, repairing, inspecting, or other operations thereon.

Another object of my invention is the provision of a gun support of the aforementioned character wherein the buttstock and forestock support members incorporate means for adjusting the distance between the gun and the aforesaid work surface, permitting the support to be used with a variety of guns and providing a degree of adjustability for the comfort of the person working on the gun.

An additional object of my invention is the provision of a support of the aforementioned character wherein the gun support is of a lightweight and inexpensive construction, such as manufactured from injection molded plastic.

A further object of my invention is the provision of gripping means associated with the buttstock member or the forestock member to accomplish the desired relative fixedness of the gun being cleaned.

Still another object of my invention is the provision of a gun support of the aforementioned character which incorporates base members that may be affixed to the aforesaid work surface, and supports members that are operably engageable with the base members through lugs or other means, whereby when the gun support is not in use, the support members may be readily disengaged from the base members, leaving the work surface relatively clear for other uses.

Other objects and advantages of the invention will be apparent from the following specification and the accompanying drawings.

Brief Description of the Drawings

FIG. 3 is a transverse sectional view of the preferred embodiment of the buttstock supporting means of the invention taken on the broken line 3—3 of FIG. 2;

FIG. 4 is a transverse sectional view of the preferred embodiment of the buttstock supporting means of the invention taken on the broken line 4—4 of FIG. 3, showing the pivoting motion of the gripping means of the invention;

Description of Preferred Embodiments of the Invention

Figure 1:
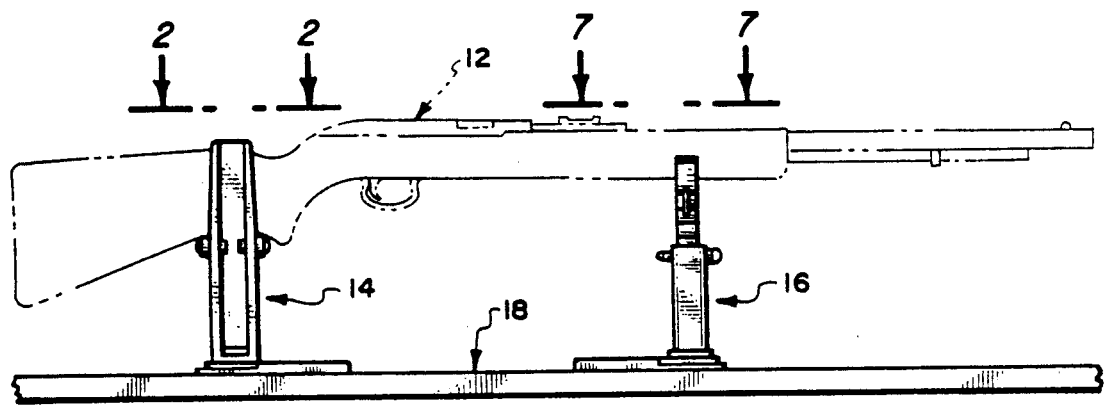
FIG. 1 is an elevational view illustrating a preferred embodiment of the adjustable gun support of the invention operatively engaging and supporting a rifle (shown in shadow)
Figure 2:
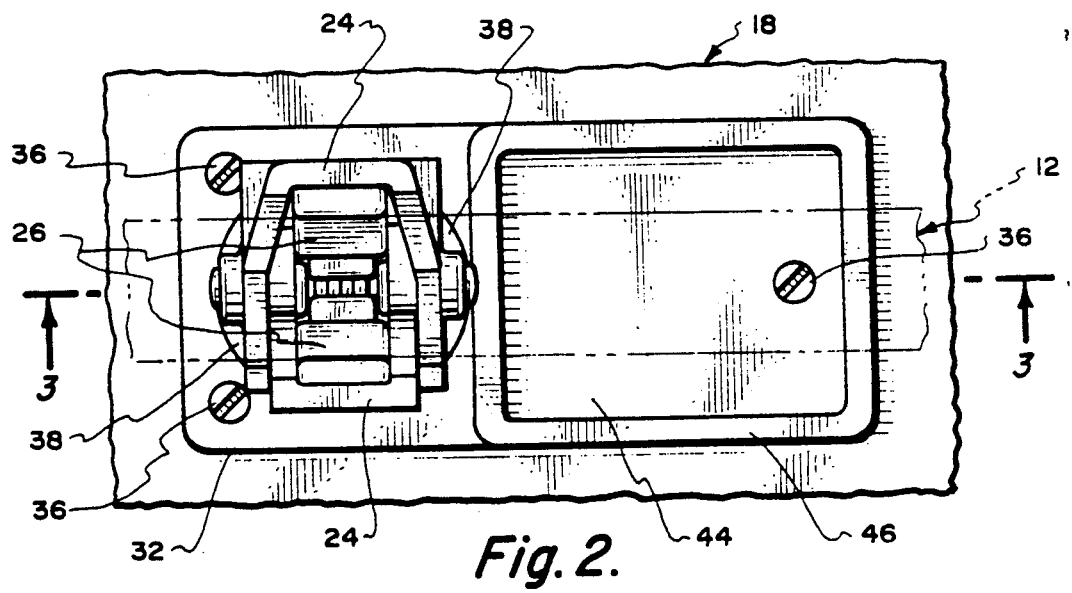
FIG. 2 is a partial plan view taken on the broken line 2—2 of FIG. 1.
Figures 5, 6:
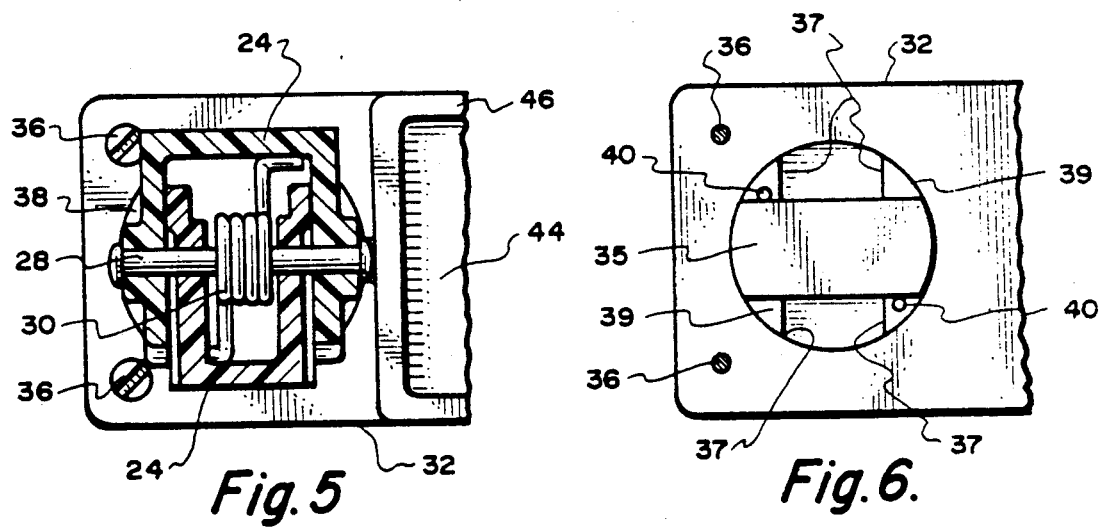
FIG. 5 is a transverse partially sectional view of the preferred embodiment of the buttstock supporting means of the invention taken on the broken line 5—5 of FIG. 3.
FIG. 6 is a transverse partial plan view of the mounting means of the preferred embodiment of the invention taken on the broken line 6—6 of FIG. 3.
Figure 7:
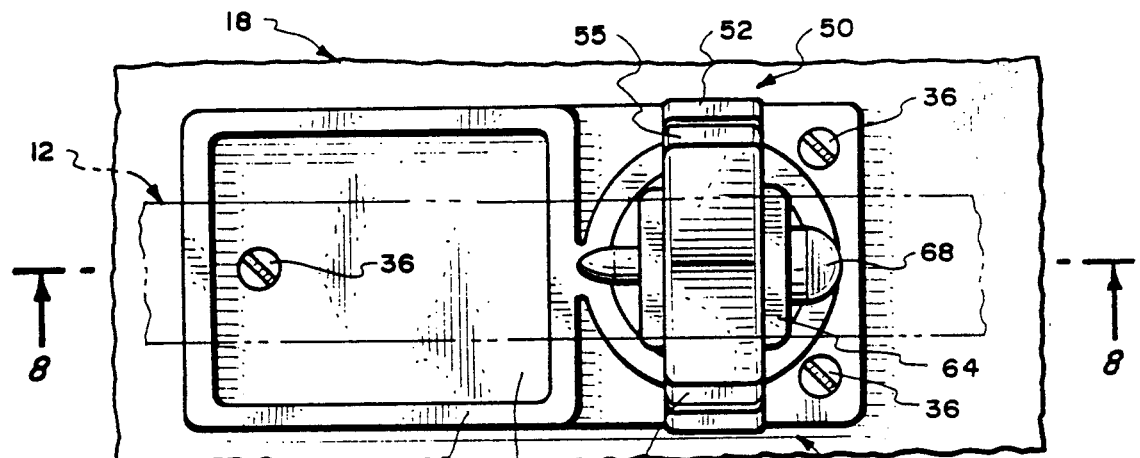
FIG. 7 is a partial plan view taken on the broken line 7—7 of FIG. 1.
Figure 8:
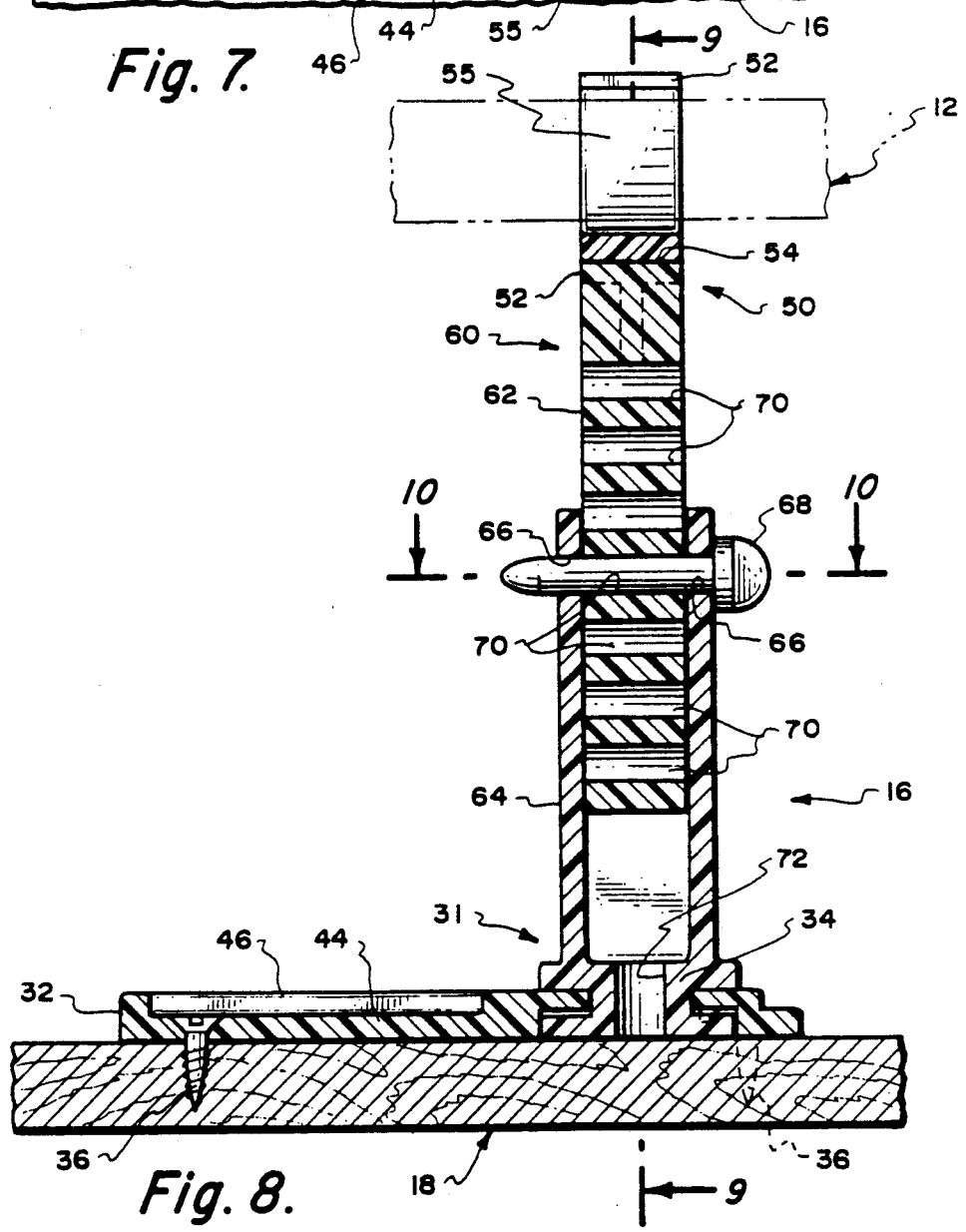
FIG. 8 is a transverse sectional view of the preferred embodiment of the forestock supporting means of the invention taken on the broken line 8—8 of FIG. 7.

Referring to the drawings, and particularly to FIG. 1 thereof, I show a preferred embodiment of a gun support 10 constructed in accordance with the teachings of the invention, and shown in operative relationship with a rifle 12 in shadow. Although I have described herein the gun support of my invention in connection with its use with a rifle, it will be obvious to those skilled in the art that the invention may be used with efficacy in connection with other types and styles of guns.

The gun support 10 includes buttstock supporting means 14 and forestock supporting means 16 operably attached to a relatively flat support surface 18, such as a workbench or tabletop. The buttstock and forestock supporting means 14 and 16 operatively support the buttstock and the forestock of the gun, respectively, and are preferably fabricated from injection molded plastic or some other suitably lightweight, strong, inexpensive material.

In the preferred embodiment, buttstock supporting means 14 includes gripping means 20, as best illustrated in FIGS. 3 and 4, which is shown as a spring-activated clamp 22. The clamp 22 includes jaws 24 having gripping surfaces 26 disposed at the teeth of the jaws 24. The jaws 24 are pivotably interengaged through the use of a pin 28 or similar expedient, and are operably assembled with a spring 30 to urge the gripping surfaces 26 toward each other. The pivoting movement of the clamp 22 is illustrated in FIG. 4 by the shadow drawing 25 of one of the jaws 24. It has been found that bending the outermost portions of the spring 30 provides a greater area of contact between the outer portions of the spring and the jaws 24 of the clamp 22, which helps reduce the wear inherent in the frictional contact between the spring and the jaws, and also helps to prevent misalignment of the spring.

The gripping surfaces 26 of the clamp 22 are suitably configured to accommodate a particular gun or any of a range of guns or other objects in gripping retention thereof. The surfaces 26 may be formed as integral portions of the jaws 24, may be fabricated as removable rubber inserts attached to the teeth of the jaws 24, or may be constructed from a material other than rubber or injection molded plastic if necessary to provide sufficient frictional gripping of the gun. In addition, the gripping surfaces 26 may be configured to operably retain any of a range of other objects, such as golf clubs, skis, fishing rods, bows (from bow and arrow sets), javelins, etc. The surfaces 26 can be provided in a range of such configurations to be interchanged as needed, such as by the provision of a selection of rubber inserts or a selection of clamps 22 readily removable from the work surface 18, as more thoroughly discussed below.

The clamp 22 is maintained in a preferred vertical alignment by the provision of mounting means 31, shown in the preferred embodiment in FIGS. 2-6 as including a base member mounting plate 32 and a support member 29 which includes the remainder of the buttstock supporting means 14. The mounting plate 32 may be temporarily or permanently affixed to the support surface 18 through the use of screws 36 or a similar expedient. As an example of an alternative method of affixation, suction cups may be attached to the base 32 and used to affix the base to a smooth work surface 18 such as the tailgate of a truck, permitting my invention to be utilized in a multitude of convenient locations and environments. The mounting plate 32 includes an elevated portion 38, spaced from the work surface 18 and having an opening 37 therein, FIG. 6, formed by retainer sections 39.

Mounting means 31 further includes a lug portion 34 operably associated with one of the jaws 24. The lug portion 34 includes a neck section 33 and a lug section 35. The neck and lug sections 33 and 35 are configured to permit the lug section 35 to pass through the opening 37 in the mounting plate 32, juxtaposing the neck section 33 with the retainer sections 39, and to thereafter permit the support member 29 to be rotated about a vertical axis into the position shown in FIGS. 3-6. Further rotation about such vertical axis is prevented by stops 40 located on the underside of the retainer sections 39.

The rotation of the support member 2 into this position also engages the lug section 35 with the inclined surfaces 42 located on the underside of retainer sections 39 adjacent the stops 40. This engagement of the lug section 35 with the inclined surfaces 42 frictionally locks the lug portion 34 onto the base member mounting plate 32, which locking is sufficiently strong to prevent inadvertent unlocking of same. The buttstock supporting means 14 of the preferred embodiment may be readily disassembled, of course, by rotating the support member 29 in the opposite direction and removing the lug section 35 through the opening 37 in the base member 32.

The base member 32 preferably includes a leverage extension portion 44 extending away from the elevated portion 38 and configured to contact the work surface 18 in intimate contiguity therewith, so as to increase the effective leverage and corresponding support of the base member 32 for the support member 29. Attachment means 36 is, in the preferred embodiment, located at the periphery of the base member 32 so as to maximize the leverage and support provided by same. A stiffening rim 46 is provided at the periphery of the leverage extension portion 44 to further increase the strength and support of the base member 32 and to provide a cupped storage area 48, FIG. 3, for retaining gunshells, bottles of cleaning solvents or oils, or other small objects.

In the preferred embodiment, the leverage extension portion 44 extends from the elevated portion 38 in a direction parallel with the lengthwise axis of the gun 12. This alignment of the base member 32 results in a narrower "footprint" for my invention on the work surface 18 and decreases the likelihood that any bottles or other objects retained in the storage area 48 will be accidentally overturned or dislodged. If additional support in the transverse direction was desired or necessary, the extension portion 44 could, of course, be manufactured so as to align in the desired transverse direction, or could be manufactured so as to extend simultaneously in several directions on the work surface 18.

Forestock supporting means 16, illustrated in the preferred embodiment thereof in FIGS. 7-10, includes mounting means 31 similar to that just described for buttstock supporting means 14. In the preferred embodiment, this similarity in mounting means permits the buttstock supporting means 14 and the forestock supporting means 16 to be readily interchanged with each other, and further permits the ready utilization of a plurality of buttstock supporting means 14 and forestock supporting means 16 with each other.

Figure 9:
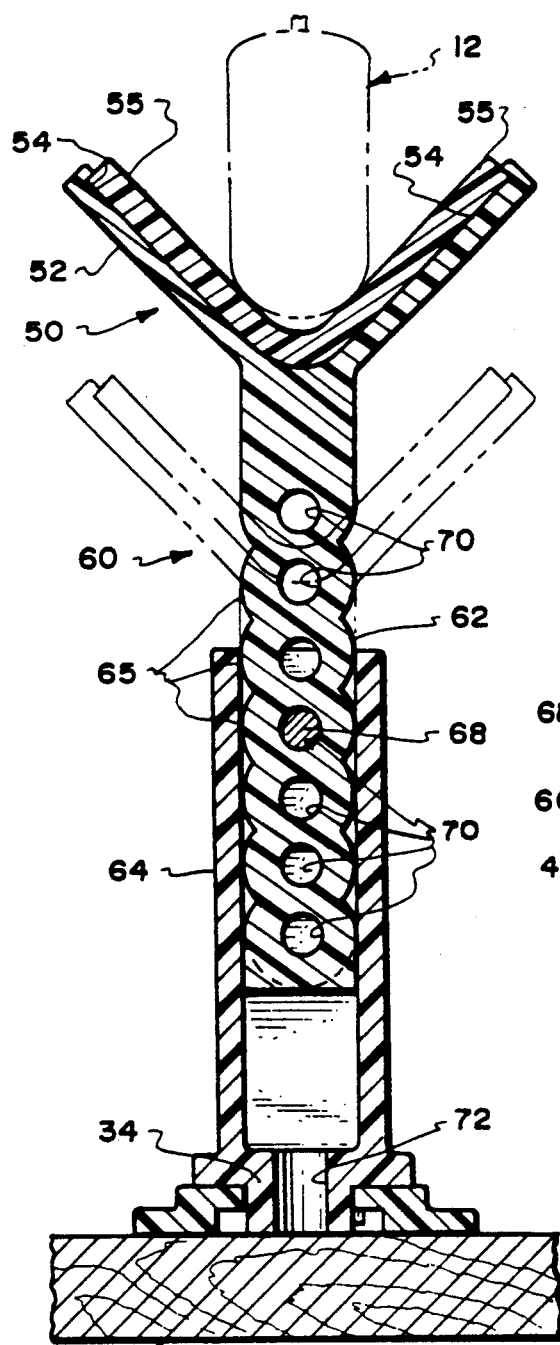
FIG. 9 is a transverse sectional view of the preferred embodiment of the forestock supporting means of the invention taken on the broken line 9—9 of FIG. 8.
Figure 10:
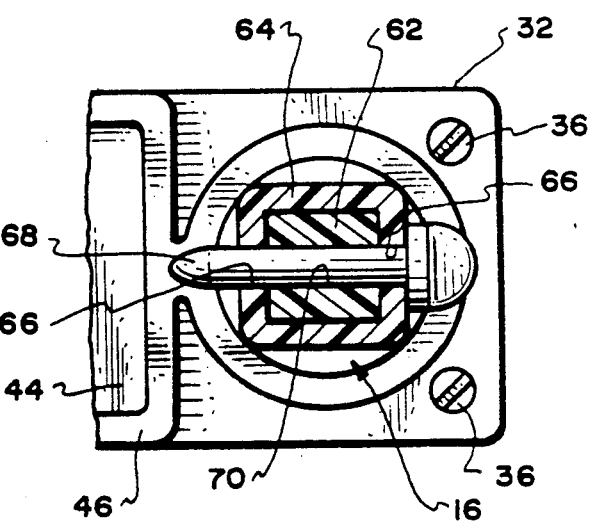
FIG. 10 is a transverse partially sectional view of the preferred embodiment of the forestock supporting means of the invention taken on the broken line 10—10 of FIG. 8.

In addition, forestock supporting means 16 includes a support portion 50 shown in the preferred embodiment as a V-shaped member 52, FIG. 9, incorporating support surfaces 54. When used on a horizontal support surface 1B to support the forestock of a rifle, as illustrated in FIGS. 1 and 7-10, the force of gravity effectively retains the forestock between the supporting surfaces 54 of the V-shaped member.

As with the gripping surfaces 26 of the clamp 22, the support surfaces 54 may be suitably configured to accommodate a particular gun or any of a range of guns in gripping retention thereof. The surfaces 54 may be formed as integral portions of the V-shaped member 52, may be fabricated to include removable rubber inserts 55 operably attached to the V-shaped member 52 such as by gluing, or may be constructed from a material other than rubber or injection molded plastic if necessary to provide sufficient frictional gripping of the gun. In addition, the support surfaces 54 may be configured to operably retain any of a range of other objects, such as golf clubs, skis, fishing rods, bows (from bow and arrow sets), javelins, etc. Similarly to the gripping surfaces 26 of the buttstock supporting means 14, the support surfaces 54 can be provided in a range of such configurations to be interchanged as needed.

Forestock supporting means 16 further includes adjustment means 60 to permit the height of the forestock supporting means 16 to be adjusted, thereby adjusting the distance between the gun 12 and the work surface 18. Adjustment means 60 includes a support arm 62 operably attached to the V-shaped member 52 and slidably disposed in a sleeve member 64. Holes 66 are provided in the sleeve member 64 to accommodate a pin 68. A series of holes 70 are provided along the length of the support arm 62, and are configured to be selectably alignable with the holes 66 whereby the pin 68 may be passed therethrough, fixing the support arm 62 at a selected position. An air passage 72 is provided through the lug portion 34 of the forestock supporting means 16 into the internal bore of the sleeve member 64, so that air may freely move into and out of that bore as the height of the support arm 62 is selectably adjusted. The operation of adjustment means 60 is illustrated in FIG. 9 by a shadow representation of the support arm 62.

In the preferred embodiment, the support arm 62 is configured with ribbed surfaces 65 along two opposing sides, forming a row of parallel, interconnected cylinders with holes 70 therethrough. Although in alternative embodiments the sides of the support arm 62 could be planar rather than ribbed, the cylindrical shape provided by the ribbed surfaces 65 reduces the area of contact between the support arm 62 and the sleeve member 64, thereby reducing the friction therebetween and correspondingly reducing the force required to reciprocate the arm in the sleeve during the height adjustment process.

Those skilled in the art will understand that alternative embodiments of adjustment means 60 would include, without limitation, means for frictionally engaging the support arm 62 at a selected height, such as an overcenter mechanism or a screw in a threaded hole 66 engaging a solid side of the support arm 62. Such alternative embodiments would, of course, provide an infinite range of selectable heights for the support arm 62.

To utilize the preferred embodiment of the gun support 10 of my invention, the base members 32 are affixed to the work surface 18 at an appropriate distance from one another, and the buttstock and forestock support members 29 are engaged with their respective base members 32 by insertion of the lug sections 35 and rotation of the support members as described above. Next, the forestock of the gun is juxtaposed to the support surfaces 54 of the forestock supporting means 16, and the buttstock of the gun is operably engaged with the clamp 22 of the buttstock supporting means 14. The height of the forestock supporting means 16 may be adjusted at any time with adjustment means 60, with safety considerations indicating that such adjustment be completed prior to placing the gun 12 thereon. In the preferred embodiment, the distance between the buttstock of the gun and the work surface 18 can be adjusted by opening the clamp 22, raising or lowering the gun buttstock to the desired height, and then releasing the clamp to engage the buttstock.

After the gun has been cleaned or repaired, it can be removed from the support by opening the clamp 22. If the work surface 18 is to be utilized for another purpose, the support members 29 may be disengaged from the base plates 32 by rotating the support members to unlock them from their respective base members 32. Unless the work surface 18 must be completely unobstructed, the base plates 32 may be left affixed to the work surface without causing unacceptable interference with subsequent activities thereon. In similar fashion, support members 29 may be interchanged or replaced with alternative members, such as ones that can accommodate objects other than guns, all without the necessity of removing or reattaching the base plates 32.

Thus, the gun support of my invention provides a safe, convenient system which may be quickly and easily assembled and disassembled.

In addition to the foregoing maintenance and repair uses, forestock supporting means 16 with its preferred V-shaped member 52, FIG. 9, may be utilized as a gun rest to assist in aiming the gun for firing. For safety reasons, the gripping means similar to that shown on buttstock supporting means 14 should not be utilized when the forestock supporting means 16 is being utilized as a gun rest.

It will be obvious to those skilled in the art that adjustment means 60 similar to that shown on forestock supporting means 16 can be provided on the buttstock supporting means 14 as well, even though a different embodiment of such adjustment means is already provided in the preferred embodiment of supporting means 14 in the form of gripping means 20, as discussed above. Likewise, gripping means similar to that shown on buttstock supporting means 14 can be provided on the forestock supporting means 16. Moreover, the gun support 10 of my invention may be oriented vertically or in some plane other than horizontal and, as indicated above, can be utilized with efficacy to adjustably grip and/or support a variety of objects other than guns, making maintenance or other work on such objects much easier and safer.

In particular, certain smaller or lighter objects such as pistols may be sufficiently supported by the provision of only one of the buttstock or forestock supporting means 14 or 16. For such objects, a preferred embodiment of my invention would include gripping means 20 and adjustment means 60 as described above, all in a single support member 29.

Finally, although I have described the gun support of my invention as being embodied in a specific configuration and as utilizing specific materials in the manufacture thereof, it will be obvious to those skilled in the art that other configurations and materials may be adapted to provide the same desirable results which will still fall within the scope of the appended claims.

I claim:

1. In a mechanism for supporting objects, the combination of:
   (a) a support surface;
   (b) a rear supporting means releasable attached to said support surface, and comprising a relatively stationary jaw and a movable jaw which is pivotably mounted at a midsection of the stationary jaw; each of said jaws including an upper object engaging portion and a lower portion; and a torsion spring mounted on the rear supporting means such that the lower jaw portions are forced apart from each other while the upper engaging portions are forced towards each other; and
   (c) a front vertically adjustable supporting means releasably attached to said support surface and comprising a stationary V-shaped member having an upper object engaging portion.

2. The mechanism of claim 1, in which each of said engaging portions include rubber pads for increased frictional contact.

3. The mechanism of claim 1 or 2, in which each of said supporting means comprise a base member having lug means which are engagable with openings in said support surface to achieve said releasability.

* * * * *